(12) United States Patent
Yamaoka et al.

(10) Patent No.: US 11,978,287 B2
(45) Date of Patent: May 7, 2024

(54) INFORMATION PROVISION SYSTEM, INFORMATION TERMINAL, AND INFORMATION PROVISION METHOD

(71) Applicant: HONDA MOTOR CO., LTD., Tokyo (JP)

(72) Inventors: Daisuke Yamaoka, Wako (JP); Kazuhiko Tanaka, Tokyo (JP); Yu Takiguchi, Wako (JP); Hitomi Hamamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 353 days.

(21) Appl. No.: 17/588,784

(22) Filed: Jan. 31, 2022

(65) Prior Publication Data
US 2022/0157087 A1 May 19, 2022

Related U.S. Application Data

(63) Continuation of application No. PCT/JP2019/031968, filed on Aug. 14, 2019.

(51) Int. Cl.
*G07C 5/00* (2006.01)
*G06T 19/00* (2011.01)
(Continued)

(52) U.S. Cl.
CPC ............ *G07C 5/006* (2013.01); *G06T 19/006* (2013.01); *G06V 20/20* (2022.01); *G06V 20/59* (2022.01);
(Continued)

(58) Field of Classification Search
CPC ...... G07C 5/006; G06T 19/006; G06V 20/20; G06V 20/59; G10L 25/63;
(Continued)

(56) References Cited

U.S. PATENT DOCUMENTS

2013/0234826 A1* 9/2013 Sekiguchi .......... H04N 21/4223
340/5.52
2014/0195099 A1 7/2014 Chen
(Continued)

FOREIGN PATENT DOCUMENTS

| JP | 2016-173691 A | 9/2016 |
| JP | 2018-81425 A | 5/2018 |
| JP | 6380169 B2 | 8/2018 |

OTHER PUBLICATIONS

International Search Report dated Sep. 17, 2019, issued in counterpart International Application No. PCT/JP2019/031968, w/English Translation. (5 pages).

*Primary Examiner* — Behrang Badii
(74) *Attorney, Agent, or Firm* — WHDA, LLP

(57) ABSTRACT

The present invention provides an information provision system that provides a user with information for coping with a problem by using an information terminal having a camera and a display, wherein the information terminal includes at least one processor with a memory comprising instructions, that when executed by the at least one processor, cause the at least one processor to at least: identify a problem area in a captured image obtained by the camera; detect agitation of the user; and suitably display, on the display, a plurality of procedure screens indicating contents of a procedure for coping with the identified problem area, in accordance with an answer from the user, and the at least one processor is configured to change a procedure screen to be displayed on the display in response to detection of agitation of the user.

12 Claims, 15 Drawing Sheets

(51) Int. Cl.
*G06V 20/20* (2022.01)
*G06V 20/59* (2022.01)
*G10L 25/63* (2013.01)
*H04M 1/72454* (2021.01)

(52) U.S. Cl.
CPC ......... *G10L 25/63* (2013.01); *H04M 1/72454* (2021.01); *H04M 2201/40* (2013.01); *H04M 2201/42* (2013.01)

(58) Field of Classification Search
CPC ......... H04M 1/72454; H04M 2201/40; H04M 2201/42; H04M 1/72403; G06F 1/1626; G06F 1/1686; G06F 1/1694; G06F 3/04815; G06F 3/0482; G06F 3/04842; G06F 3/0488; B60S 5/00; G06Q 50/10
See application file for complete search history.

(56) References Cited

U.S. PATENT DOCUMENTS

2020/0159777 A1\* 5/2020 Weldemariam .......... G06N 3/04
2020/0311347 A1\* 10/2020 Theobald ................ G06F 40/35

\* cited by examiner

INFORMATION PROVISION SYSTEM, INFORMATION TERMINAL, AND INFORMATION PROVISION METHOD

CROSS-REFERENCE TO RELATED APPLICATIONS

This application is a continuation of International Patent Application No. PCT/JP2019/031968 filed on Aug. 14, 2019, the entire disclosures of which is incorporated herein by reference.

BACKGROUND OF THE INVENTION

Field of the Invention

The present invention relates to an information provision system, an information terminal, and an information provision method for providing a user with information for coping with a problem.

In a case where a problem such as a failure occurs in a vehicle or the like, it is preferable to allow the user to grasp what kind of problem has occurred or what kind of measure should be taken against the problem. For example, Patent Literature 1 discloses a method for performing a failure diagnosis of a vehicle on the basis of diagnostic data collected using a sensor provided in a terminal device and a decision tree model in which a plurality of question items and a plurality of request items are represented in a tree-like hierarchical structure.

In the method described in Patent Literature 1, the state of the diagnosis target (vehicle) is merely asked unilaterally, and the state of the user such as agitation of the user due to occurrence of a problem, for example, is not considered. In an agitated state, the user generally has lower determination ability, and it may be difficult for the user to appropriately cope with a problem. Therefore, it is desirable to appropriately provide such a user with information.

Therefore, an object of the present invention is to appropriately provide a user with information for coping with a problem.

CITATION LIST

Patent Literature

PTL 1: Japanese Patent No. 6380169

SUMMARY OF THE INVENTION

According to the present invention, there is provided an information provision system that provides a user with information for coping with a problem by using an information terminal having a camera and a display, wherein the information terminal includes at least one processor with a memory comprising instructions, that when executed by the at least one processor, cause the at least one processor to at least: identify a problem area in a captured image obtained by the camera; detect agitation of the user; and suitably display, on the display, a plurality of procedure screens indicating contents of a procedure for coping with the identified problem area, in accordance with an answer from the user, and the at least one processor is configured to change a procedure screen to be displayed on the display in response to detection of agitation of the user.

Further features of the present invention will become apparent from the following description of exemplary embodiments with reference to the attached drawings.

DESCRIPTION OF EMBODIMENTS

Figure 1:
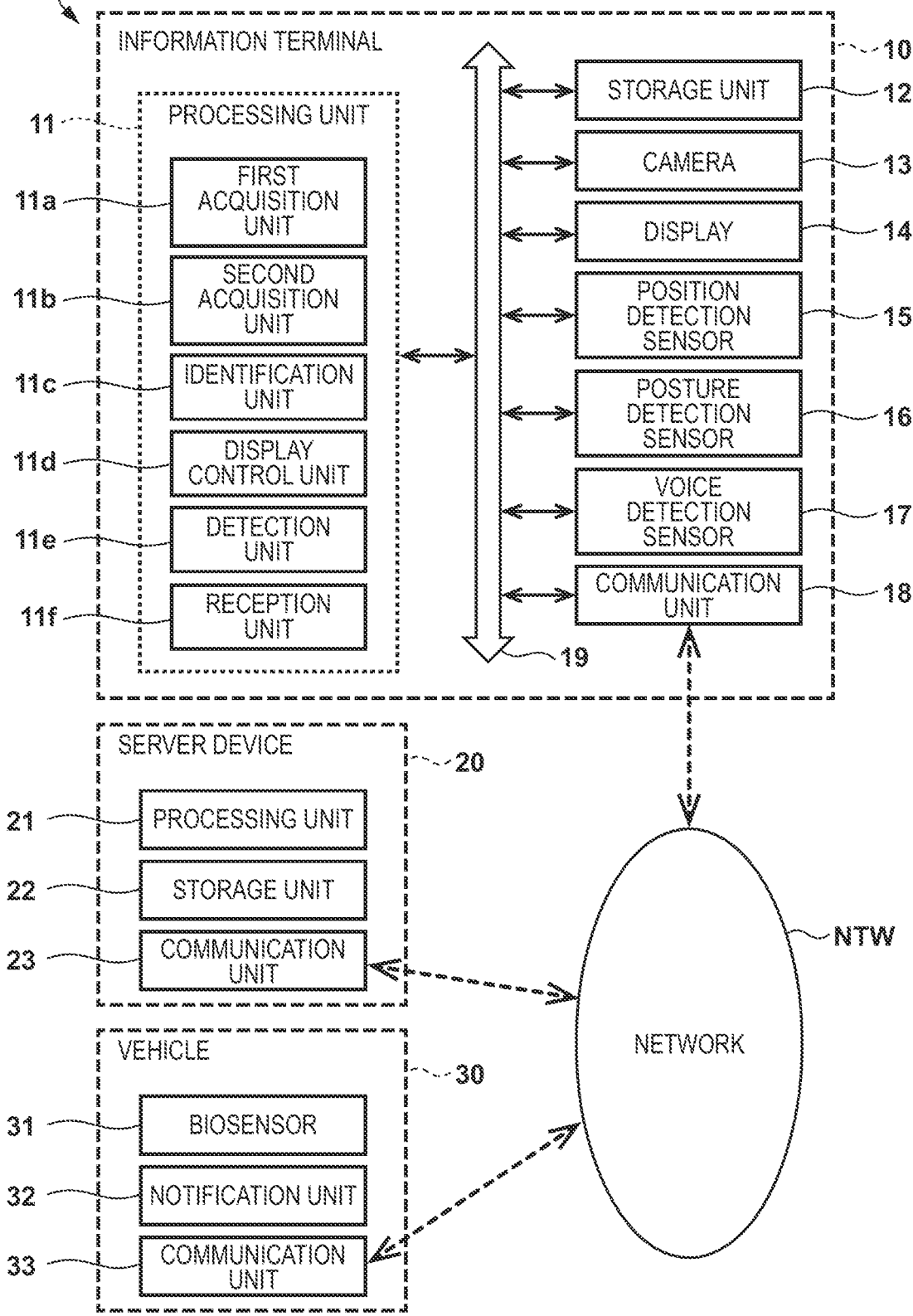
FIG. 1 is a block diagram illustrating the configuration of an information provision system.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

An information provision system 100 of a first embodiment according to the present invention will be described. Although an example in which the information provision system 100 is applied to a vehicle will be described in the present embodiment, the present invention is not limited thereto, and the information provision system 100 of the present embodiment can also be applied to a device other than a vehicle. Examples of the vehicle include a four-wheeled vehicle, a straddle type vehicle (two-wheeled vehicle, three-wheeled vehicle), a ship, an aircraft, a lawn mower, and a snow blower. In the present embodiment, a four-wheeled vehicle will be described as an illustration of the vehicle.

[Configuration Example of Information Provision System]

FIG. 1 is a block diagram illustrating the configuration of the information provision system 100 of the present embodiment. The information provision system 100 of the present embodiment includes an information terminal 10 and a server device 20 (cloud) communicably connected with each other via, for example, a network NTW, and is a system for providing a user with information for coping with a problem such as a failure of a vehicle or lighting of a warning lamp, for example.

Here, as illustrated in FIG. 1, the information provision system 100 may include a vehicle 30 as a component. The vehicle 30 can include, for example, a biosensor 31 that detects the biological state of a user (e.g., occupant or driver), a notification unit 32 that provides notification of occurrence of a problem in the vehicle 30, and a communication unit 33 communicably connected with the information terminal 10 and the server device 20 via the network NTW. The biosensor 31 can include, for example, a sensor that detects the pulse, blood pressure, or perspiration amount of the user, a sensor that detects the direction of the line of sight of the user, or the like. Moreover, in a case where a problem such as lighting of a warning light has occurred in the vehicle 30, the notification unit 32 generates a signal indicating the occurrence of the problem and transmits the signal to the information terminal 10 via the communication unit 33. Note that processing using the biosensor 31 and the notification unit 32 of the vehicle 30 will be described in the second embodiment.

First, the configuration of the information terminal 10 will be described. The information terminal 10 can include, for example, a processing unit 11, a storage unit 12, a camera 13, a display 14, a position detection sensor 15, a posture detection sensor 16, a voice detection sensor 17, and a communication unit 18. The units of the information terminal 10 are communicably connected with each other via a system bus 19. Examples of the information terminal 10 include a smartphone and a tablet terminal. In the present embodiment, an example in which a smartphone is used as the information terminal 10 will be described. A smartphone and a tablet terminal are mobile terminals having various functions in addition to a call function, and are different from each other in display size. The display size of the tablet terminal is generally larger than that of the smartphone.

The processing unit 11 includes a processor represented by a CPU, a storage device such as a semiconductor memory, an interface with an external device, and the like. The storage unit 12 stores a program to be executed by the processor, data to be used for processing by the processor, and the like. The processing unit 11 can read the program stored in the storage unit 12 to the storage device such as a memory and execute the program. In the present embodiment, the storage unit 12 stores an application program (information provision program) for providing a user with information for coping with a problem, and the processing unit 11 can read the information provision program stored in the storage unit 12 to the storage device such as a memory and execute the information provision program.

The camera 13 has a lens and an imaging element, and photographs a subject to acquire a captured image. The camera 13 can be provided on, for example, an outer surface opposite to an outer surface on which the display 14 is provided. Moreover, the display 14 displays an image to notify the user of information. In the present embodiment, the display 14 can display the captured image acquired by the camera 13 in real time. Here, the display 14 of the present embodiment includes, for example, a touchscreen liquid crystal display (LCD) or the like, and therefore has not only a function of displaying an image but also a function of accepting input of information by the user. However, the present invention is not limited thereto. The display 14 may have only a function of displaying an image, and an input unit (e.g., a keyboard, a mouse, etc.) may be provided independently of the display 14.

The position detection sensor 15 detects the position and orientation of the information terminal 10. The position detection sensor 15 can include, for example, a GPS sensor that receives a signal from a GPS satellite to acquire the current position of the information terminal 10, an orientation sensor that detects an orientation in which the camera 13 of the information terminal 10 is directed on the basis of geomagnetism or the like, or the like. In the present embodiment, the description of the "position of the information terminal 10" includes not only the current position of the information terminal 10 but also the orientation of the information terminal 10. Moreover, the posture detection sensor 16 detects the posture of the information terminal 10. As the posture detection sensor 16, a vibration sensor (acceleration sensor), a gyro sensor, or the like can be used, for example. The voice detection sensor 17 is, for example, a microphone, and detects the voice of the surrounding environment such as the voice or breathing of the user.

The communication unit 18 is communicably connected with the server device 20 via the network NTW. Specifically, the communication unit 18 has a function as a reception unit that receives information from the server device 20 via the network NTW, and a function as a transmission unit that transmits information to the server device 20 via the network NTW.

As a specific configuration of the processing unit 11, a first acquisition unit 11*a*, a second acquisition unit 11*b*, an identification unit 11*c*, a display control unit 11*d*, a detection unit 11*e*, and a reception unit 11*f* can be provided, for example. The first acquisition unit 11*a* acquires data of a captured image obtained by the camera 13. The second acquisition unit 11*b* acquires information or data from the server device 20 and the vehicle 30 via the communication unit 18. The identification unit 11*c* performs image processing such as pattern matching, for example, to analyze the captured image, and identifies the problem area in the captured image displayed on the display 14. The display control unit 11*d* controls display of the captured image obtained by the first acquisition unit 11*a* on the display 14, and controls display of a confirmation screen or a procedure screen to be described later on the display 14. The detection unit 11*e* detects agitation of the user on the basis of detection results of various sensors. The reception unit 11*f* receives a signal indicating the occurrence of the problem from the vehicle 30.

Next, the configuration of the server device 20 will be described. The server device 20 can include a processing unit 21, a storage unit 22, and a communication unit 23. The processing unit 21 includes a processor represented by a CPU, a storage device such as a semiconductor memory, an interface with an external device, and the like. The storage unit 22 stores a program to be executed by a processor, data to be used by the processor for processing, and the like, and the processing unit 21 can read the program stored in the storage unit 22 to a storage device such as a memory to execute the program. Moreover, the communication unit 23 is communicably connected with the information terminal 10 via the network NTW. Specifically, the communication unit 23 has a function as a reception unit that receives information from the information terminal 10 via the network NTW, and a function as a transmission unit that transmits information to the information terminal 10 via the network NTW.

In the case of the present embodiment, the server device 20 (storage unit 22) stores information (which may be hereinafter referred to as coping information) for coping with each of various problems that occur in the vehicle. The coping information includes a plurality of procedure screens indicating the contents of a procedure for coping with a problem. Moreover, the plurality of procedure screens are configured in a tree-like hierarchical structure, for example, and are suitably displayed on the display 14 in accordance with an answer from the user. Specifically, each of the plurality of procedure screens includes a plurality of answer items selectable by the user as answers to the content of the procedure, and a next procedure screen associated with an answer item selected by the user is displayed on the display 14.

[Processing in Information Terminal]

Figure 2:
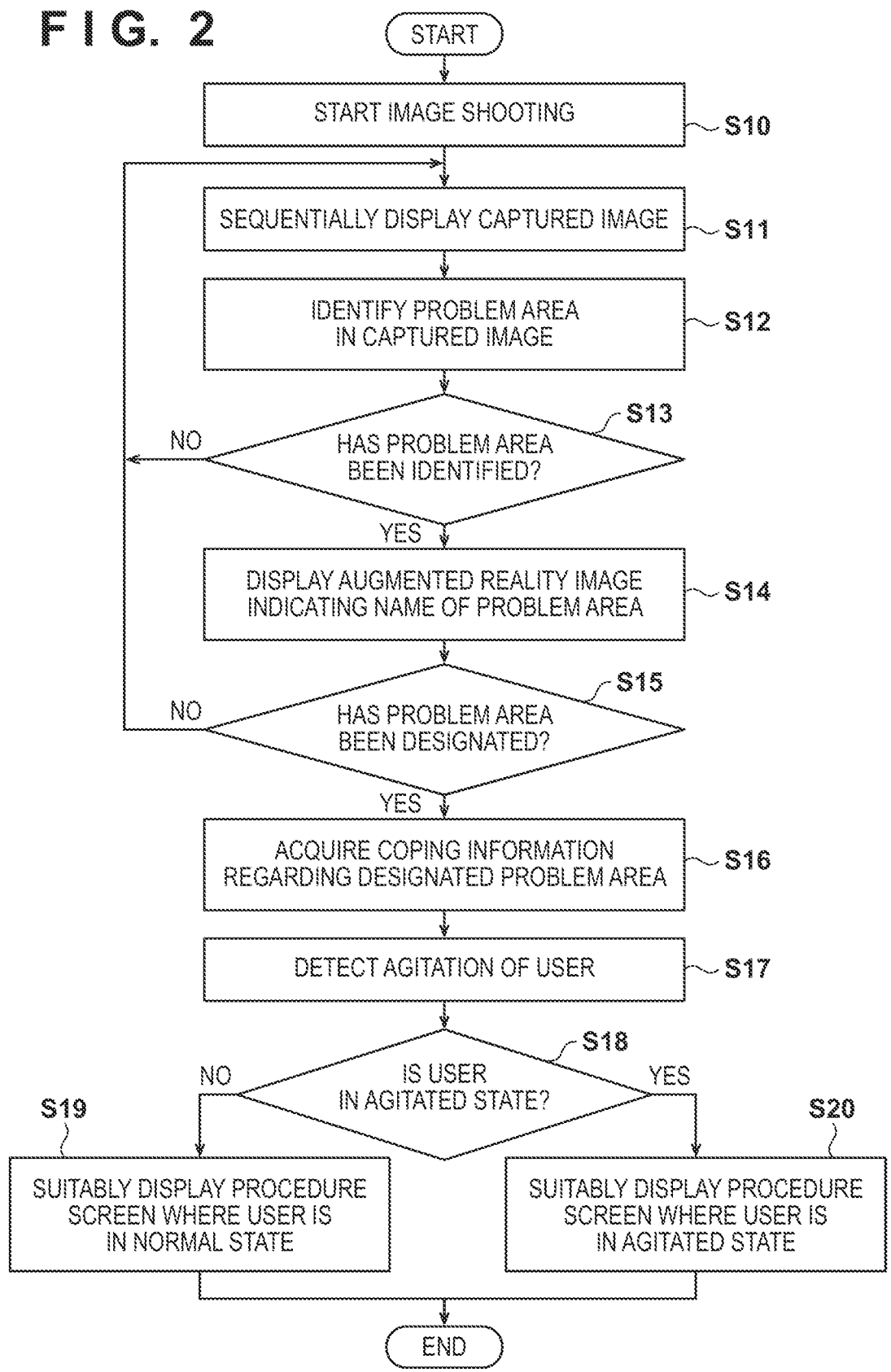
FIG. 2 is a flowchart illustrating processing of providing coping information regarding a problem area.
Figure 3:
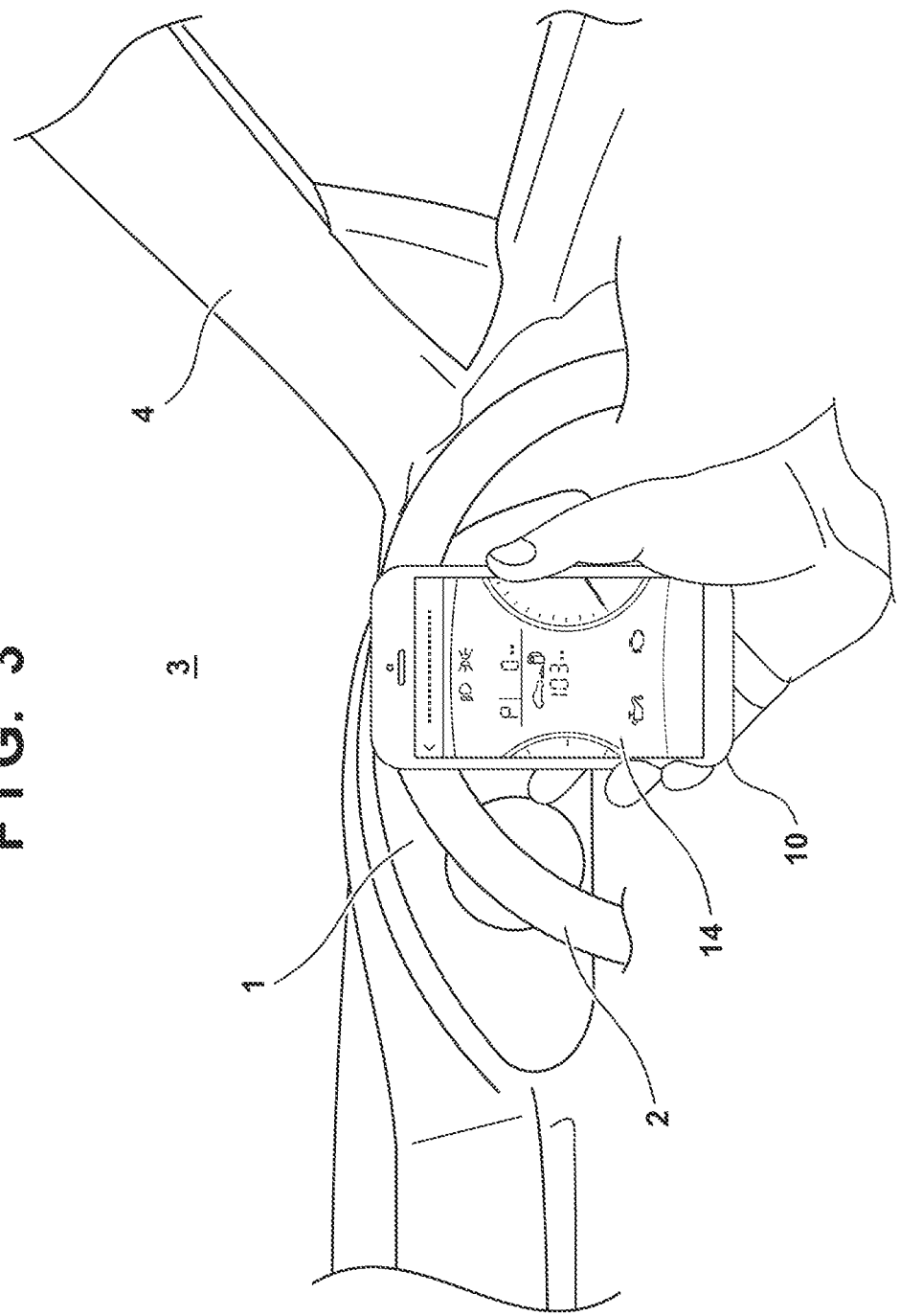
FIG. 3 is a view illustrating a situation in which a meter panel in a vehicle is photographed.
Figure 13:
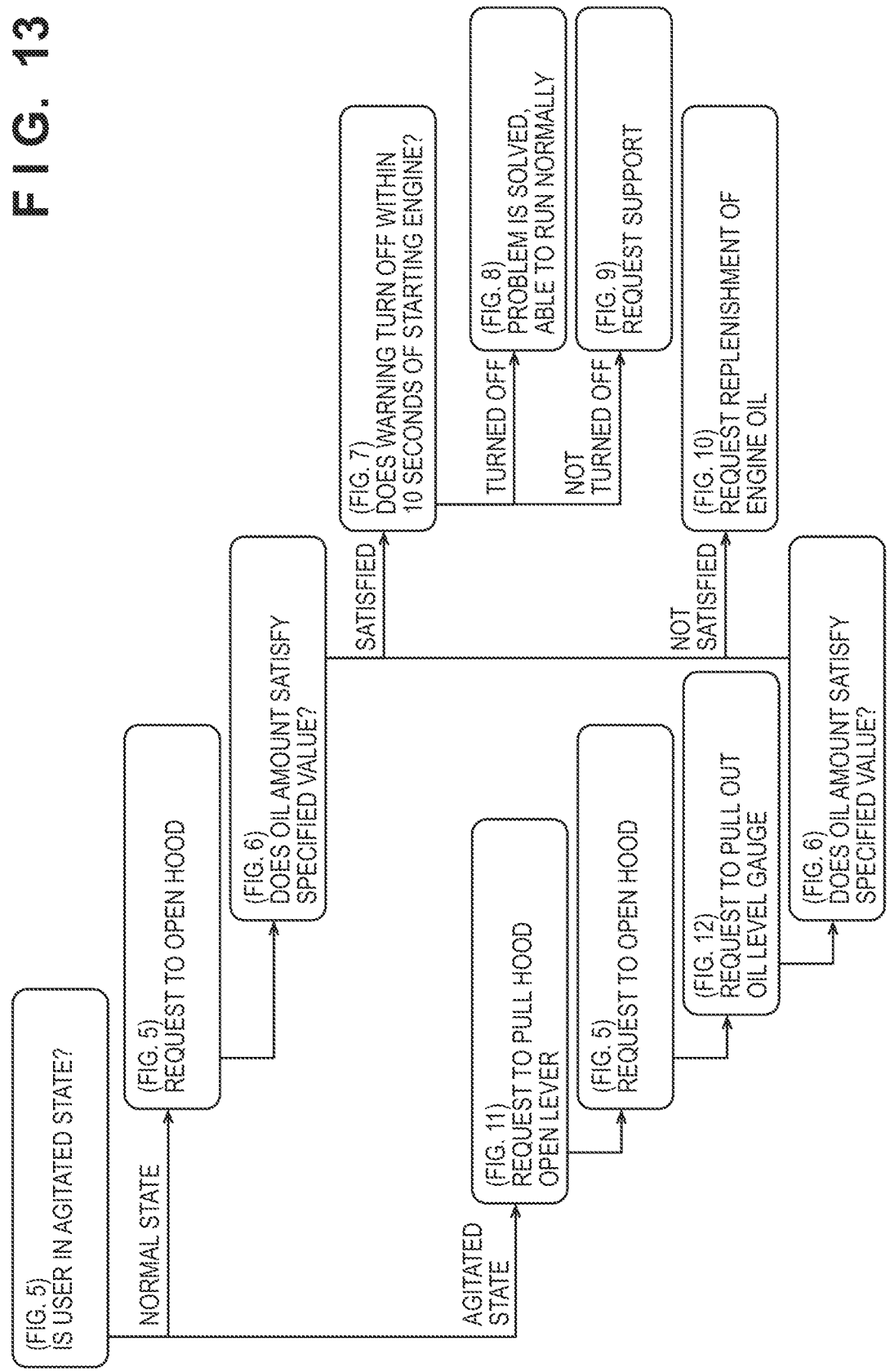
FIG. 13 is a diagram illustrating a display control flow for a plurality of procedure screens.

Next, processing to be performed by the information terminal 10 when the information provision program is executed will be described. FIG. 2 is a flowchart illustrating processing to be performed by the processing unit 11 of the information terminal 10 when an information provision program is executed, and FIGS. 3 to 12 are diagrams for explaining the respective steps of the flowchart illustrated in FIG. 2. FIG. 3 illustrates a state in which the inside of the vehicle is photographed using the camera 13 of the information terminal 10, and FIGS. 4 to 12 illustrate the respective procedure screens to be displayed on the display 14 of the information terminal 10. Moreover, FIG. 13 illustrates a display control flow for a plurality of procedure screens illustrated in FIGS. 5 to 12.

In S10, the processing unit 11 (first acquisition unit 11a) causes the camera 13 to start photographing, and acquires a captured image from the camera 13. In S11, the processing unit 11 (display control unit 11d) sequentially displays captured images acquired from the camera 13 on the display 14. For example, FIG. 3 illustrates a situation in which the camera 13 of the information terminal 10 photographs a meter panel 1 in the vehicle. In this case, in the information terminal 10, the captured images of the meter panel 1 obtained by the camera 13 are sequentially displayed on the display 14. Note that FIG. 3 illustrates a vehicle interior environment seen by the user, and illustrates the meter panel 1, a steering wheel 2, a windshield 3, and a right front pillar 4.

In S12, the processing unit 11 (identification unit 11c) identifies a problem area in a captured image displayed on the display 14. The problem area can include at least one of an article in an abnormal state different from a normal state, or a notification sign indicating that the article is in an abnormal state. In the case of the present embodiment, examples of the "article" include a vehicle itself and a part of a vehicle, and examples of the "abnormal state" include a failure and a damage. Moreover, examples of the "notification sign" include lighting/blinking of a warning lamp such as a hydraulic warning lamp or an engine warning lamp, and an abnormal sound or a warning sound.

For example, the processing unit 11 can determine which part of the vehicle is photographed by the camera 13 to obtain the captured image, by performing known image processing. An example of the known image processing is a method of detecting, in the captured image, a part (feature point) having a feature value such as a corner, curvature, change in brightness, or change in color, and recognizing a part (photographed part) of the vehicle photographed by the camera 13 from feature information indicating the feature value, positional relationship, or the like of the detected feature point. Moreover, the server device 20 (storage unit 22) stores an image of the vehicle (e.g., the inside of the vehicle) in a normal state in which no problem (abnormality) has occurred. The processing unit 11 acquires an image of the vehicle in the normal state corresponding to the recognized photographed part from the server device 20, and compares the captured image obtained by the camera 13 with the image of the vehicle in the normal state so as to identify an area where a difference occurs in the images as a problem area.

Here, although the processing of identifying the problem area is performed by the processing unit 11 (identification unit 11c) of the information terminal 10 in the present embodiment, the processing may be performed by the processing unit 21 of the server device 20. In this case, the information terminal 10 (processing unit 11) sequentially transmits captured images obtained by the camera 13 to the server device 20 via the communication unit 18. The processing unit 21 of the server device 20 compares a captured image received from the information terminal 10 with the image of the vehicle in the normal state to identify a problem area, and transmits information indicating the identified problem area to the information terminal 10 via the communication unit 23.

In S13, the processing unit 11 determines whether a problem area has been identified in the captured image displayed on the display 14 or not. The processing proceeds to S14 in a case where a problem area has been identified in the captured image, or returns to S11 in a case where no problem area has been identified in the captured image.

In S14, the processing unit 11 (display control unit 11d) displays an augmented reality (AR) image indicating the name of the problem area over a captured image obtained by the camera 13 on the display 14 as a designation button for the user to designate the problem area identified in S12. At this time, the processing unit 11 displays the augmented reality image serving as a designation button on the display so that the augmented reality image is aligned with the position of the problem area in the captured image detected by the position detection sensor 15 and the posture detection sensor 16.

Figure 4:
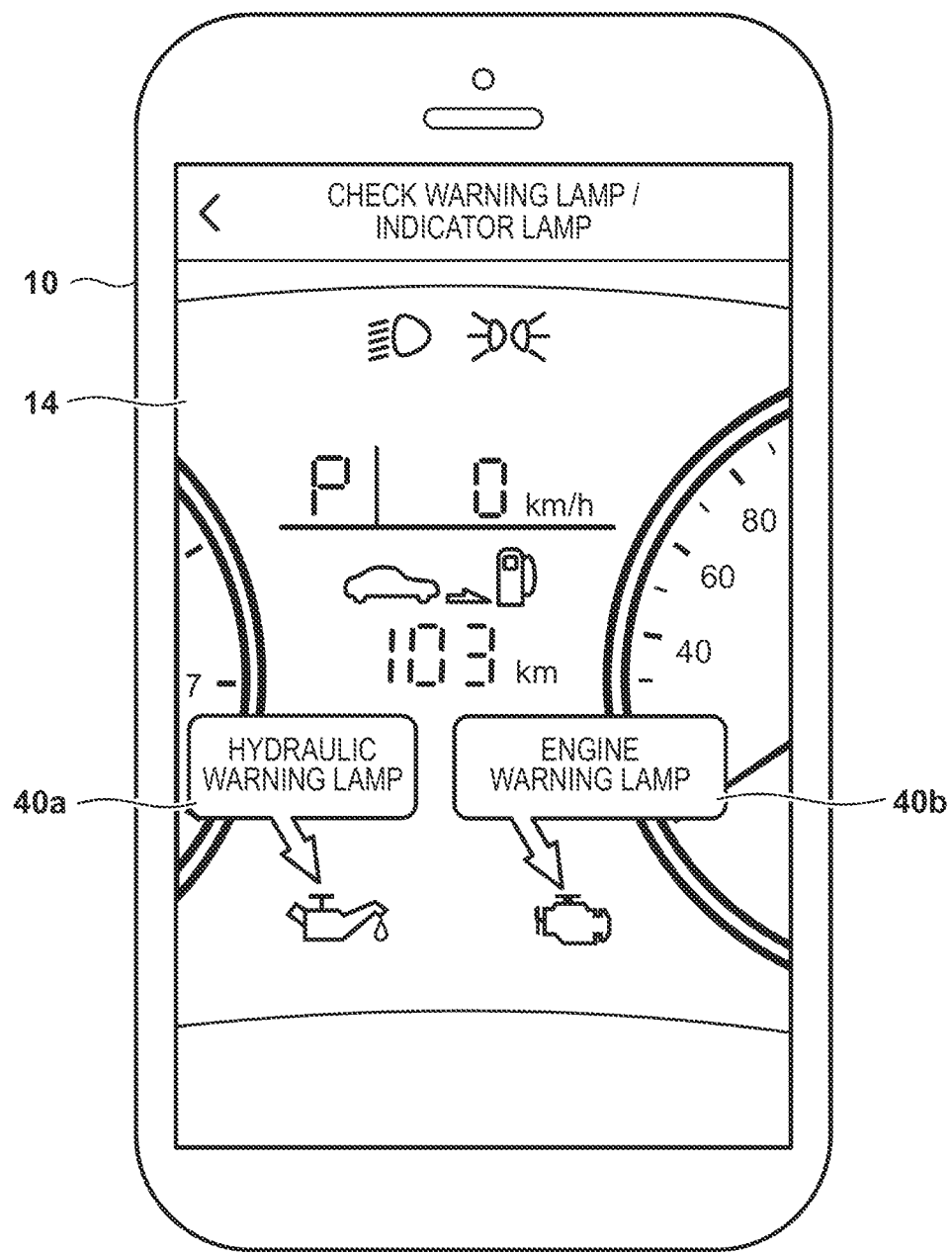
FIG. 4 is a diagram illustrating an example of displaying an augmented reality image over a captured image.

For example, assume that a hydraulic warning lamp and an engine warning lamp are lighted in the meter panel. In this case, the processing unit 11 identifies the lighting of the hydraulic warning lamp and the engine warning lamp as problem areas (S12), and displays augmented reality images indicating the names of the hydraulic warning lamp and the engine warning lamp over the captured image on the display 14 as designation buttons (S14). FIG. 4 illustrates an example in which augmented reality images 40a and 40b indicating the names of the hydraulic warning lamp and the engine warning lamp are displayed over the captured image on the display 14 as designation buttons. As a result, the user can designate a problem area that the user wants to cope with, by touching one of the augmented reality images 40a and 40b functioning as designation buttons on the display 14. A case where the user touches the augmented reality image 40a indicating the name of the hydraulic warning lamp and designates lighting of the hydraulic warning lamp will be described below.

In S15, the processing unit 11 determines whether the user has designated a problem area he/she wants to cope with or not. The processing proceeds to S16 in a case where the user has designated a problem area, or returns to S11 in a case where no problem area has been designated. In S16, the processing unit 11 acquires coping information regarding the problem area designated by the user in S15 from the server device 20. In the case of the present embodiment, the coping information acquired from the server device 20 in S16 can include data of a plurality of procedure screens indicating contents of the procedure for coping with the problem area. Here, although the coping information regarding the problem area is stored in the server device 20 and is acquired from the server device 20 by communication with the server device 20 in the present embodiment, the present invention is not limited thereto. For example, coping information regarding a problem area may be stored in the storage unit 12 of the information terminal 10 in advance, so that the coping information is acquired from the storage unit 12.

In S17, the processing unit 11 (detection unit 11e) detects agitation of the user. For example, in a case where the user is agitated, the user may have a biological reaction such as shaking of his/her hand holding the information terminal 10, or shaking of the voice or breathing. Therefore, the processing unit 11 can detect agitation of the user on the basis of a detection result of the posture detection sensor 16 (vibration sensor) or the voice detection sensor 17. Specifically, in a case where the average value of vibrations of the information terminal 10 detected by the vibration sensor of the posture detection sensor 16 is equal to or larger than a predetermined value, the processing unit 11 can determine that the hand holding the information terminal 10 is shaking and determine that the user is in an agitated state. Moreover, in a case where the shaking of the voice or breathing of the user detected by the voice detection sensor 17 is equal to or larger than a predetermined value, the processing unit 11 can determine that the user is in an agitated state.

In S18, the processing unit 11 determines whether agitation of the user has been detected in S17 or not. In an agitated state, the user generally has lower determination ability, and it may be difficult for the user to appropriately cope with the problem area. Therefore, in the present embodiment, a procedure screen to be displayed on the display 14 is changed in response to detection of agitation of the user in S17. The processing proceeds to S19 in a case where no agitation of the user has been detected (i.e., in a case where the user is in a normal state (in normal period)), or the processing proceeds to S20 in a case where agitation of the user has been detected (i.e., in a case where the user is in an agitated state).

In S19, the processing unit 11 suitably displays, on the display 14, a procedure screen for allowing the user in a normal state to cope with the problem area. In the display control flow illustrated in FIG. 13, this step is a step to which the processing proceeds in a case where the state of the user is a normal state, and the procedure screens illustrated in FIGS. 5 to 12 are sequentially displayed on the display 14.

For example, the processing unit 11 displays a procedure screen 41 (FIG. 5) on the display. On the procedure screen 41 (FIG. 5), a procedure content of "Open the hood" is displayed, and the user touches an answer button 41a of "Opened" on the display in a case where the user has opened the hood. In a case where a touch on the answer button 41a has been detected, the processing unit 11 displays a procedure screen 42 (FIG. 6) on the display 14. On the procedure screen 42 (FIG. 6), a question of "Does the oil amount satisfy the specified value?" is displayed together with a procedure content of "Check the engine oil amount". The user checks the engine oil amount, and touches either an answer button 42a of "The specified value is satisfied" or an answer button 42b of "Less than the specified value" on the display 14.

In a case where a touch on the answer button 42a on the procedure screen 42 (FIG. 6) has been detected, the processing unit 11 displays a procedure screen 43 (FIG. 7) on the display 14. On the procedure screen 43 (FIG. 7), a question of "Has the hydraulic warning lamp been turned off within 10 seconds?" is displayed together with a procedure content of "Start the engine". The user touches either an answer button 43a of "The warning lamp has been turned off" or an answer button 43b of "The warning lamp has not been turned off" on the display 14. In a case where a touch on the answer button 43a has been detected, a procedure screen 44 (FIG. 8) indicating that the problem has been solved is displayed on the display 14. In a case where a touch on the answer button 43b has been detected, a procedure screen 45 (FIG. 9) for requesting support (e.g., repair request) is displayed on the display 14. The procedure screen 45 (FIG. 9) is provided with a plurality of selection buttons 45a regarding contacts, and a call is made to the contact of a selection button 45a touched on the display 14 by the user.

On the other hand, in a case where a touch on the answer button 42b on the procedure screen 42 (FIG. 6) has been detected, the processing unit 11 displays a procedure screen 46 (FIG. 10) for requesting replenishment of engine oil on the display 14. The procedure screen 46 (FIG. 10) is provided with selection buttons 46a for each checking a nearby gas station or dealer. A nearby gas station or dealer is searched for in accordance with a selection button 46a touched on the display 14, and the search result is displayed on a map.

Referring back to the flowchart illustrated in FIG. 2, in S20, the processing unit 11 suitably displays, on the display 14, a procedure screen for allowing the user in an agitated state to cope with the problem area. In the display control flow illustrated in FIG. 13, this step is a step to which the processing proceeds in a case where the state of the user is an agitated state, and displayed on the display is a procedure screen indicating a more detailed content of the procedure than in a case where the user is in a normal state. Specifically, a procedure screen indicating a content of the procedure divided into smaller portions than in a case where the user is in a normal state is displayed on the display 14.

For example, the processing unit 11 displays a procedure screen 47 (FIG. 11) on the display 14. On the procedure screen 47 (FIG. 11), a procedure content of "Pull the hood opening lever at the lower right of the driver seat" is displayed, and the user touches an answer button 47a of "Pulled" on the display 14 in a case where the user has pulled the hood opener. In a case where a touch on the answer button 47a has been detected, the processing unit 11 displays the procedure screen 41 (FIG. 5) on the display 14. Although only the procedure content of "Open the hood" is displayed on the procedure screen 41 illustrated in FIG. 5, a more detailed procedure content such as "Put your hand in a gap at the tip of the hood, and open the hood while tilting the lever" may be displayed, for example. In a case where the user has opened the hood, the user touches the answer button 41a of "Opened" on the display 14.

In a case where a touch on the answer button 41a on the procedure screen 41 (FIG. 5) has been detected, the processing unit 11 displays a procedure screen 48 (FIG. 12) on the display 14. On the procedure screen 48 (FIG. 12), a procedure content of "Extract the oil level gauge" is displayed, and the user touches an answer button 48*a* of "Extracted" on the display in a case where the user has extracted the oil level gauge. In a case where a touch on the answer button 48*a* has been detected, the processing unit 11 displays the procedure screen 42 (FIG. 6) on the display 14. Note that the following processing is similar to that of a case where the user is in a normal state. As described above, in a case where the user is in an agitated state, a procedure content to be displayed on one procedure screen in a case where the user is in a normal state is divided into a plurality of items and displayed on the display 14.

Figure 5:
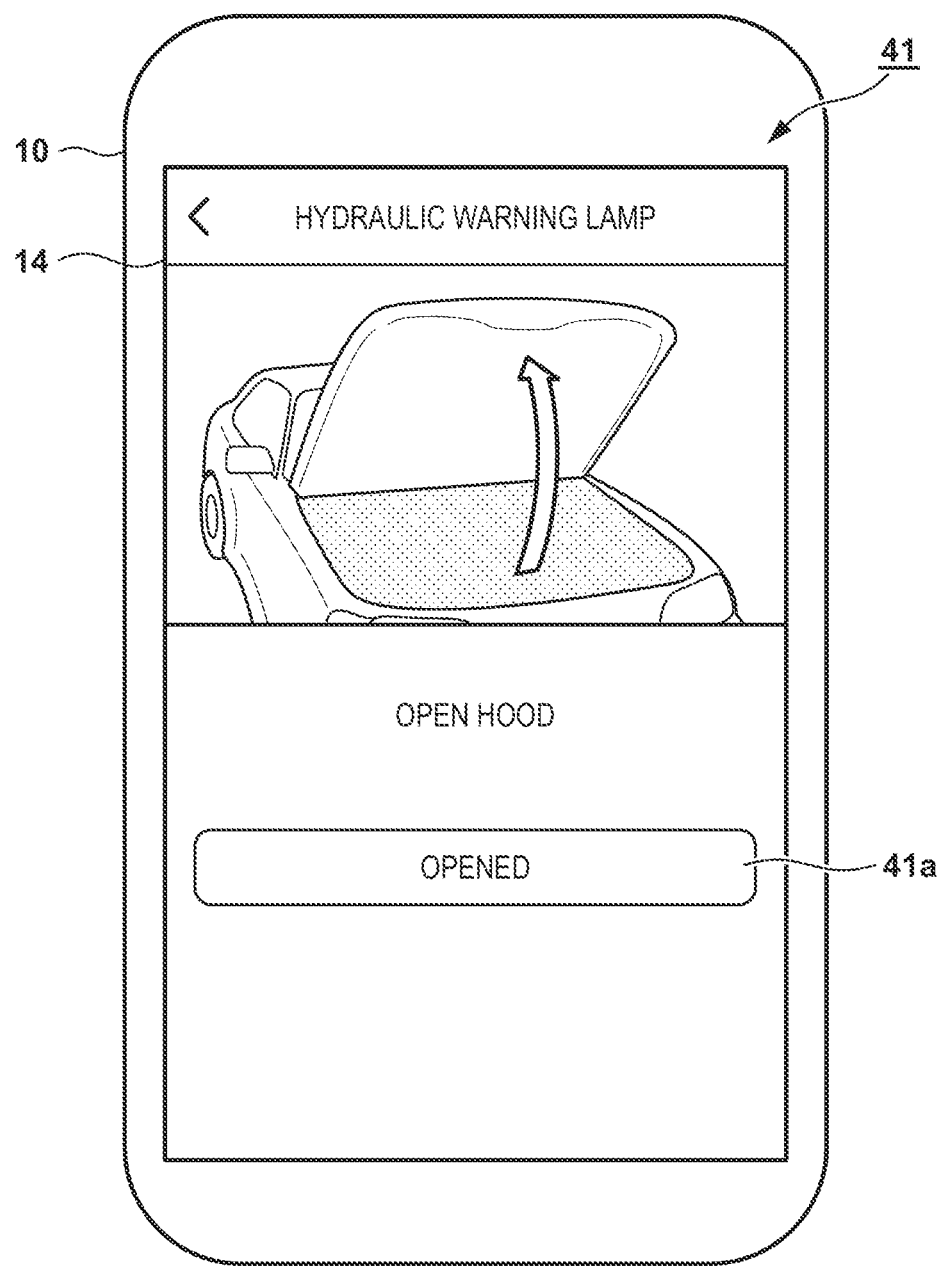
FIG. 5 is a diagram illustrating a procedure screen for giving an instruction to open a hood.
Figure 6:
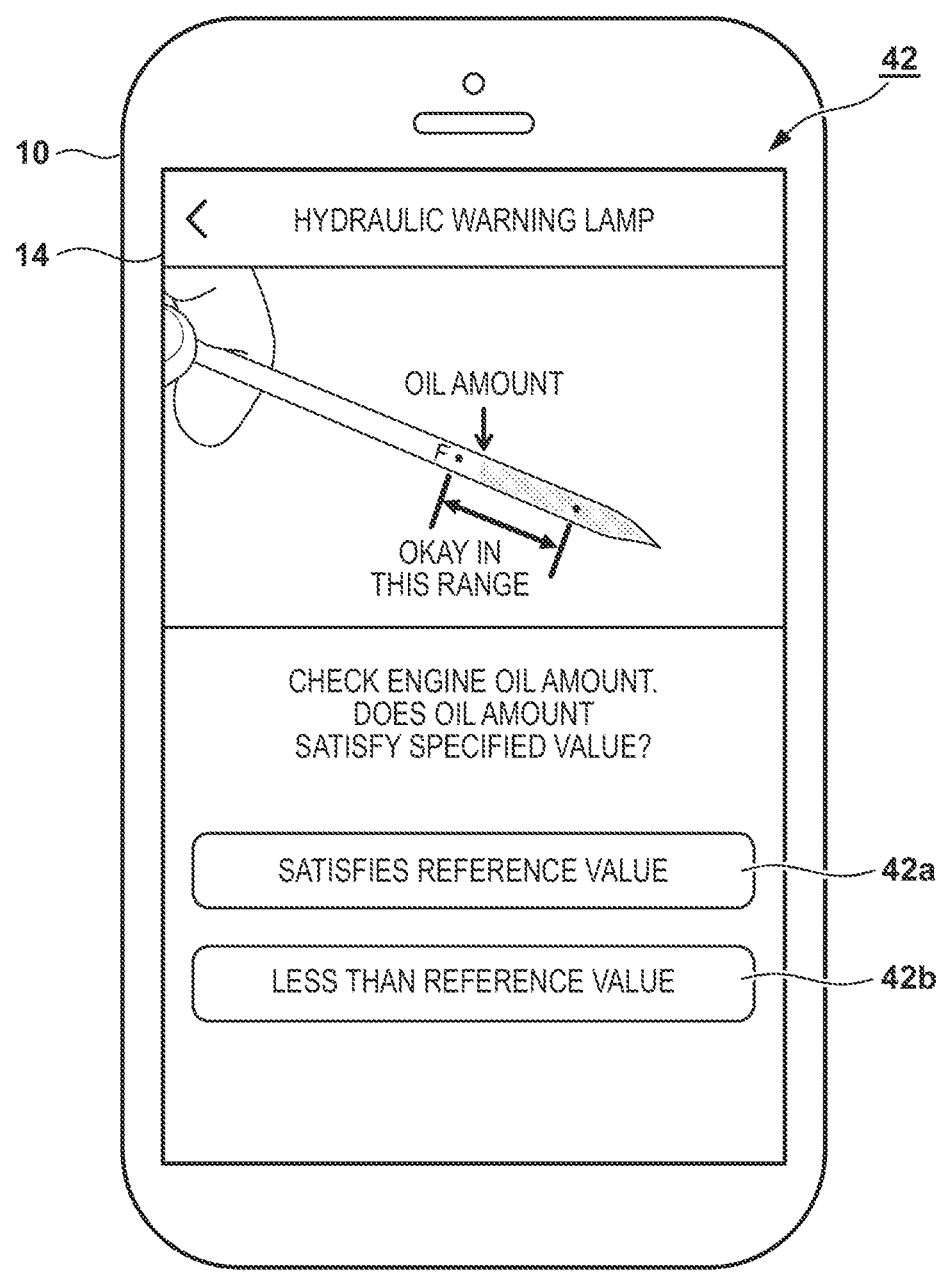
FIG. 6 is a diagram illustrating a procedure screen for giving an instruction for an investigation of the engine oil amount.
Figure 7:
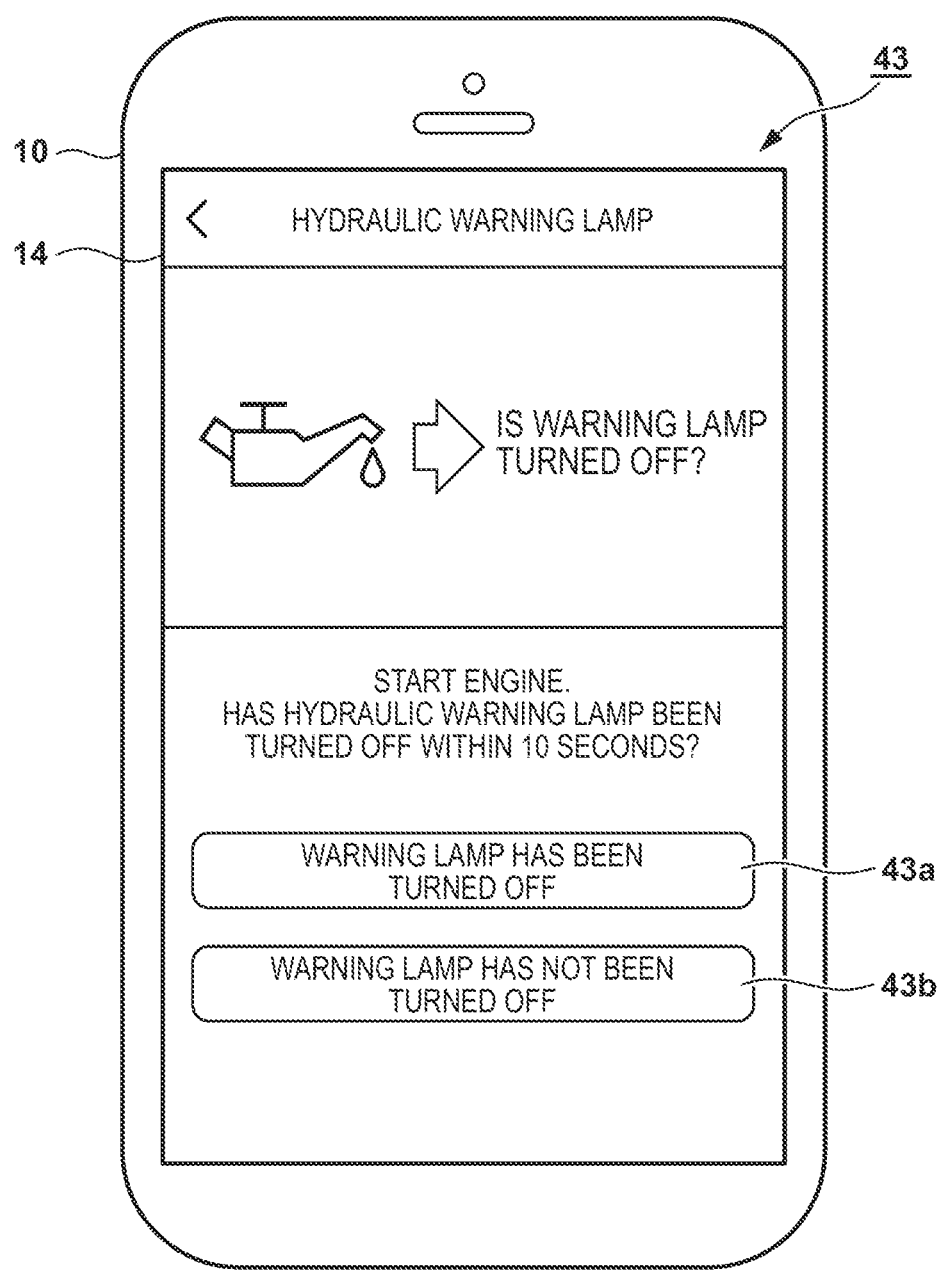
FIG. 7 is a diagram illustrating a procedure screen for giving an instruction for starting of an engine.
Figure 8:
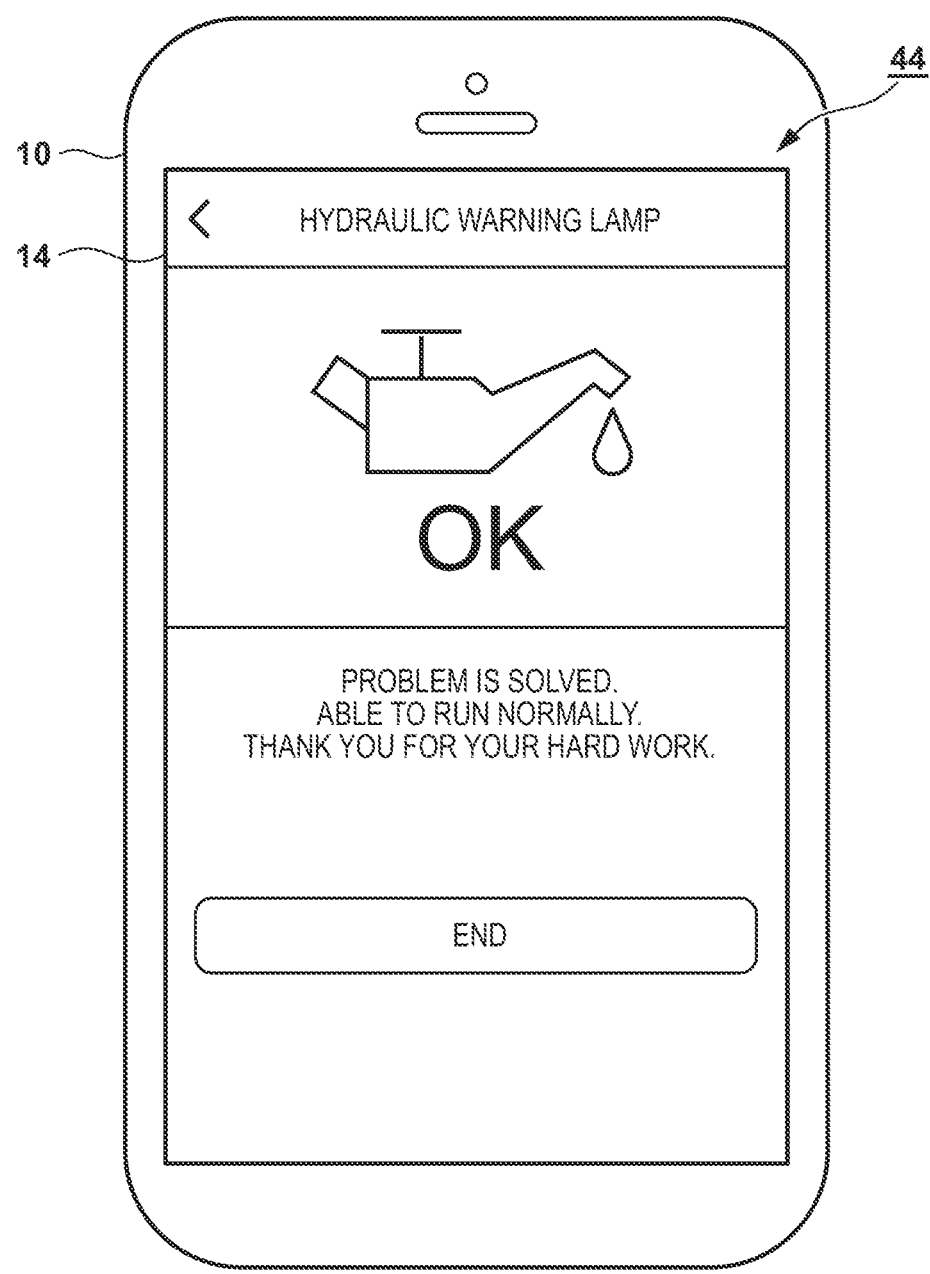
FIG. 8 is a diagram illustrating a screen indicating that a problem has been solved.
Figure 9:
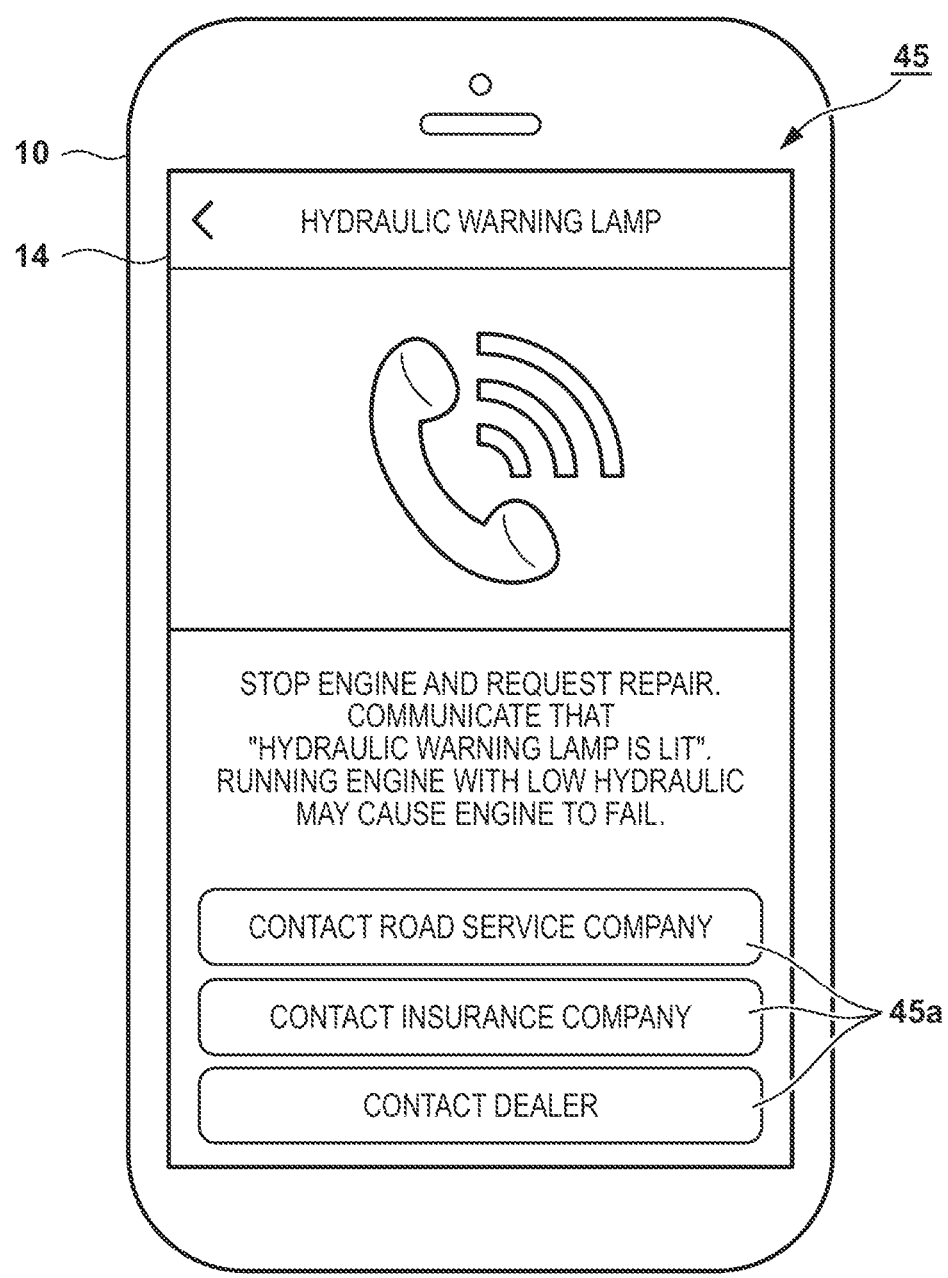
FIG. 9 is a diagram illustrating a procedure screen for requesting support.
Figure 10:
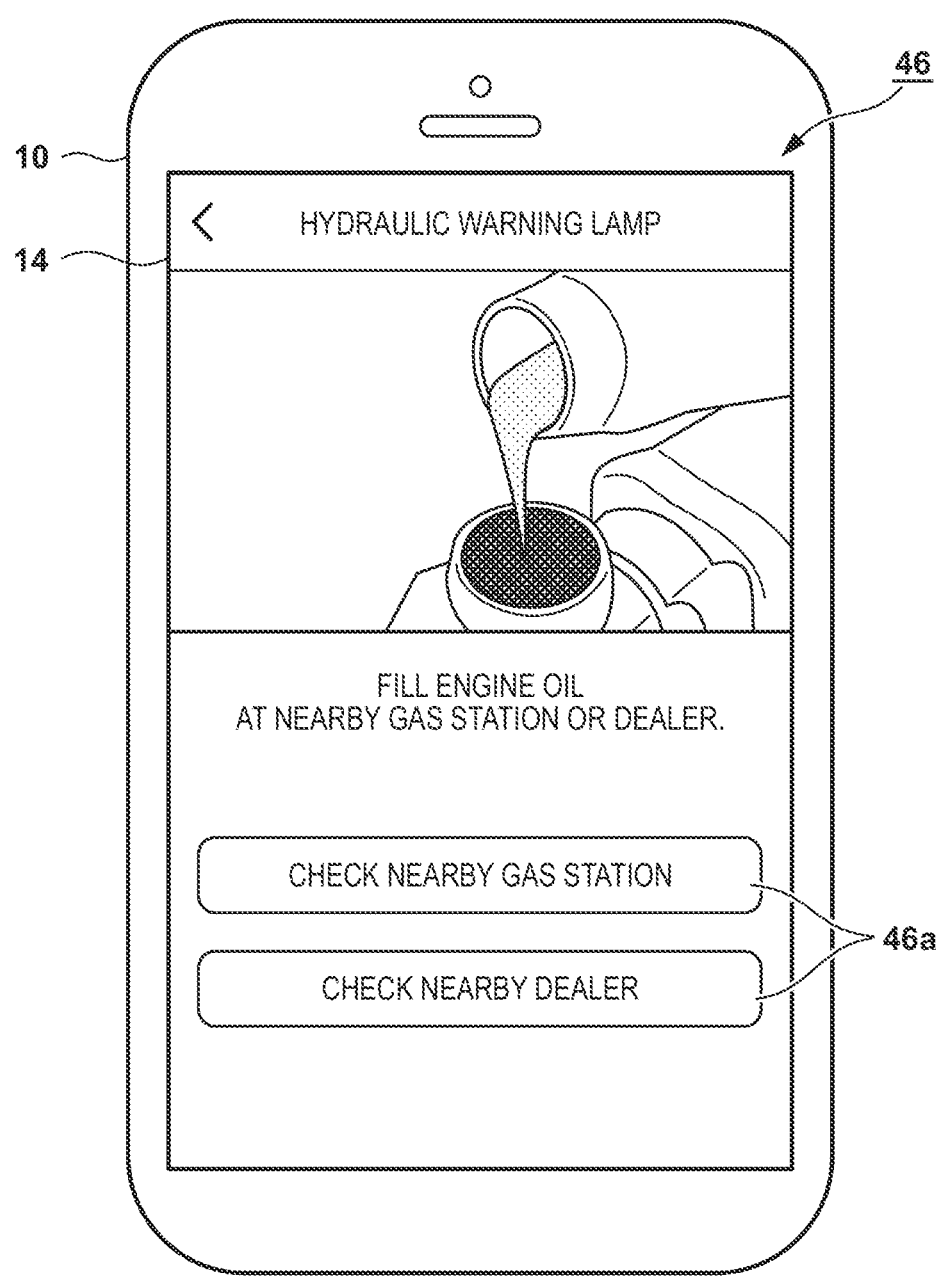
FIG. 10 is a diagram illustrating a procedure screen for giving an instruction for replenishment of engine oil.
Figure 11:
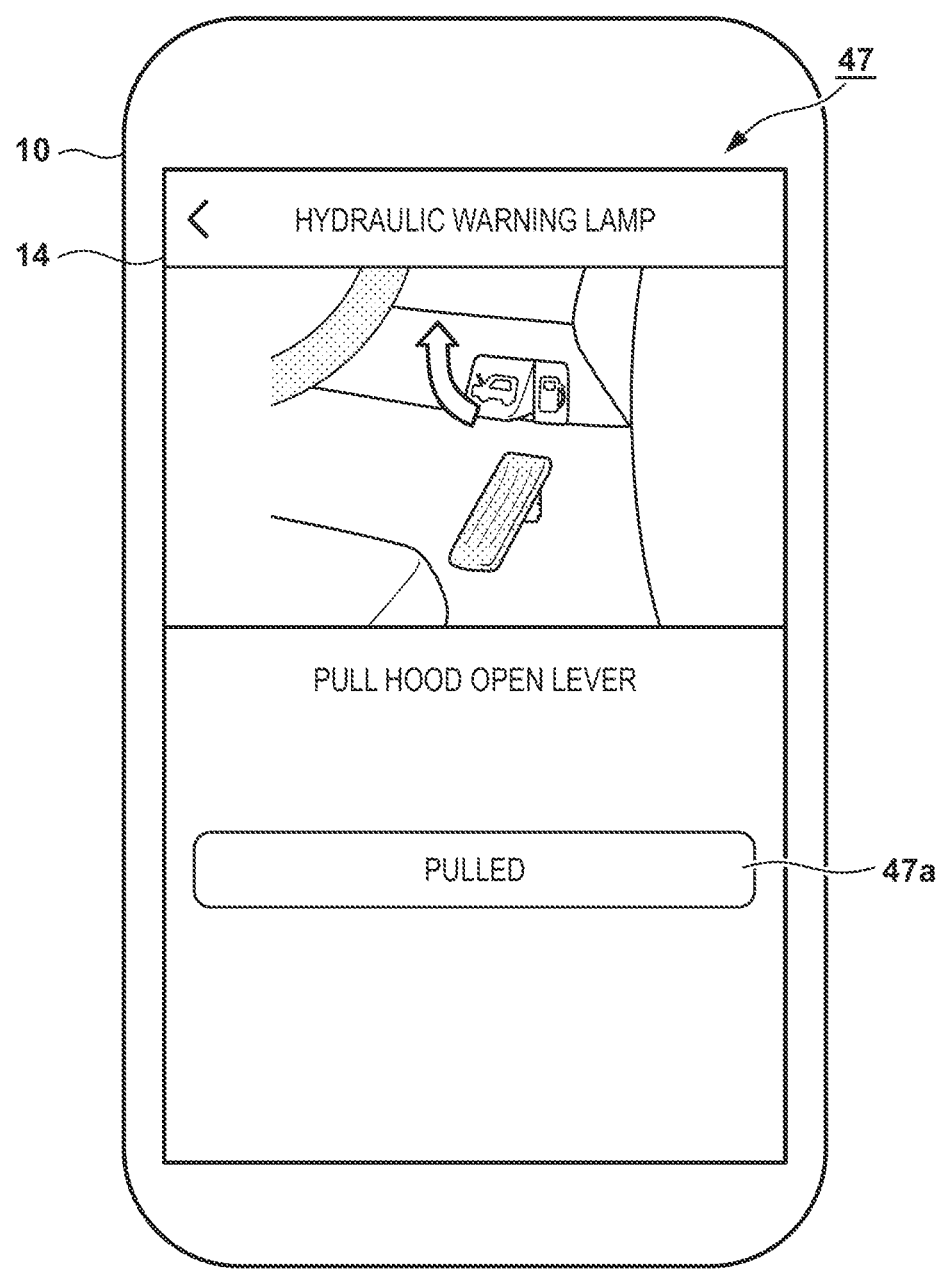
FIG. 11 is a diagram illustrating a procedure screen for giving an instruction to pull a hood opening lever.
Figure 12:
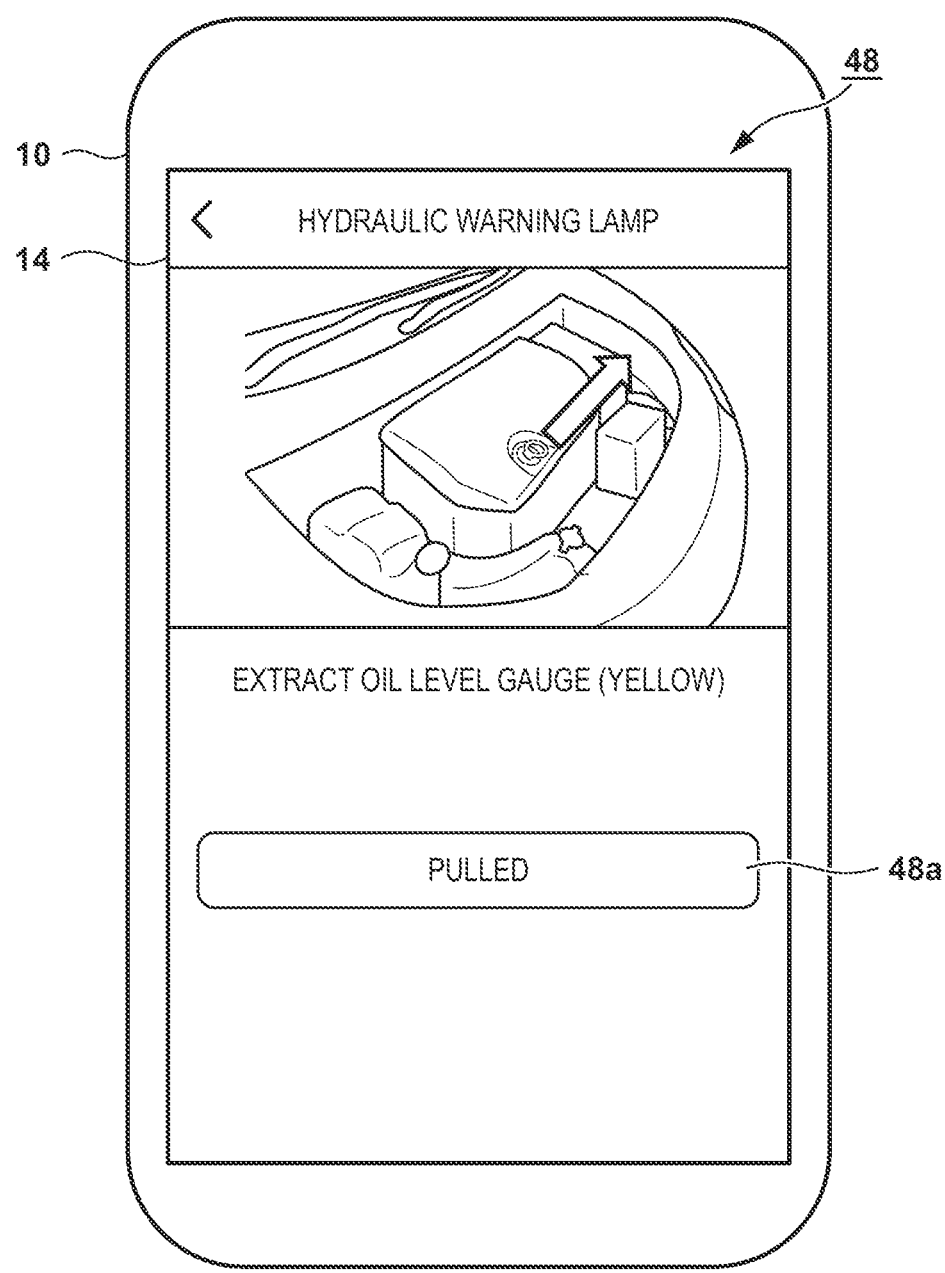
FIG. 12 is a diagram illustrating a procedure screen for giving an instruction to extract an oil level gauge.

Here, the processing unit 11 may sequentially detect agitation of the user during the process of S20, shift to S19 in a case where agitation of the user is no longer detected, and display, on the display 14, a procedure screen indicating a procedure content corresponding to a case where the user is in a normal state. For example, it is assumed that the average value of vibrations of the information terminal 10 detected by the vibration sensor of the posture detection sensor 16 becomes smaller than a predetermined value, or the shaking of the voice or breathing of the user detected by the voice detection sensor 17 becomes smaller than a predetermined value during the process of S20, so that agitation of the user is no longer detected. In this case, when a touch on the answer button 41*a* on the procedure screen 41 illustrated in FIG. 5 is detected, the processing unit 11 may skip the procedure screen 48 illustrated in FIG. 12 and display the procedure screen 42 illustrated in FIG. 6 on the display 14.

As described above, the information provision system 100 according to the present embodiment changes a procedure screen to be displayed on the display 14 for coping with the problem area in response to detection of agitation of the user. For example, in a case where agitation of the user has been detected, the information terminal 10 (processing unit 11) displays, on the display, a procedure screen indicating a more detailed procedure content than in a case where no agitation of the user has been detected (in a case where the user is in a normal state). As a result, it is possible to present the procedure content for coping with the problem area in more detail in a case where the user is in an agitated state, while it is possible to reduce botheration that the procedure content is presented in detail in a case where the user is in a normal state. That is, it is possible to provide the user with an appropriate procedure content for coping with the problem area in accordance with the state of the user.

Second Embodiment

An information provision system of the second embodiment according to the present invention will be described. The information provision system of the present embodiment basically takes over the information provision system 100 of the first embodiment, and the configuration and processing are as described in the first embodiment. However, the information system of the present embodiment is different from the first embodiment in that processing of confirming whether to provide information (coping information) for coping with a problem or not to the user in a case where the problem such as lighting of a warning lamp has occurred, for example, is further added.

Figure 14:
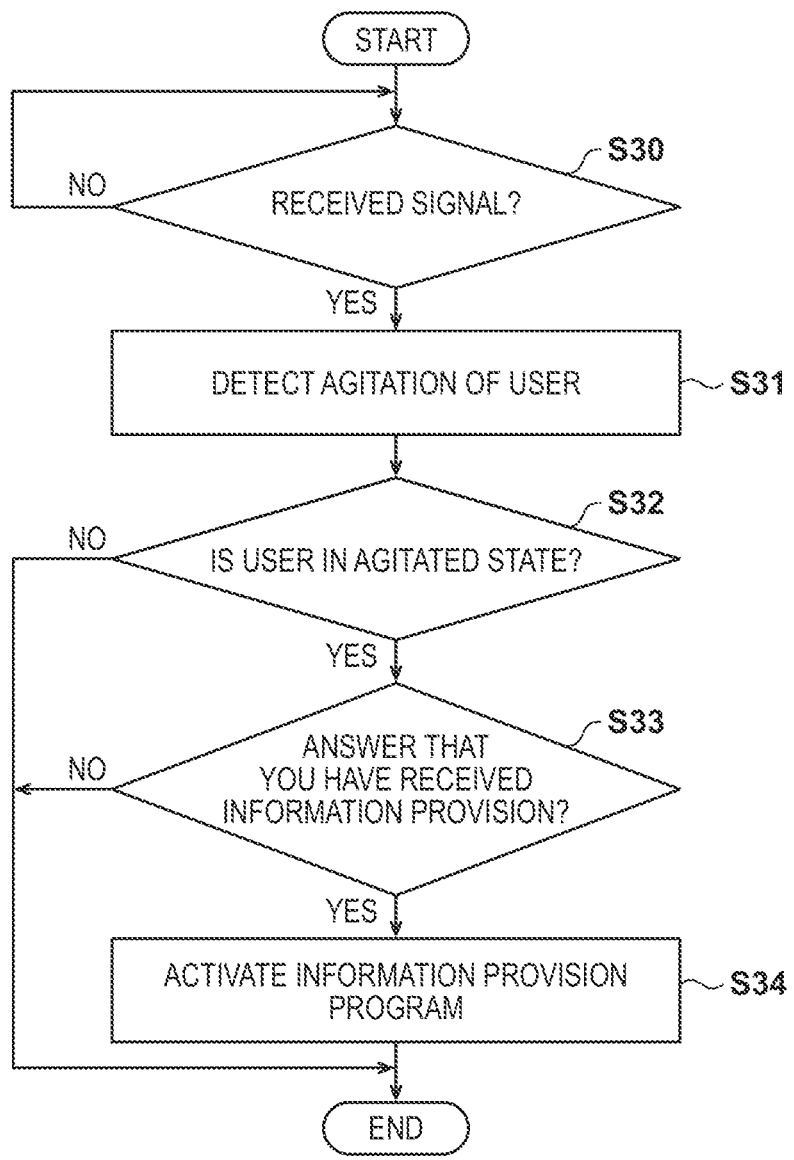
FIG. 14 is a flowchart illustrating processing of confirming whether to receive provision of coping information or not to a user.

FIG. 14 is a flowchart illustrating processing of confirming whether to receive provision of the coping information or not to the user. The flowchart illustrated in FIG. 14 can be performed by the processing unit 11 of the information terminal 10 before the flowchart illustrated in FIG. 2 is started.

In S30, the processing unit 11 (reception unit 11*f*) determines whether a signal indicating occurrence of a problem has been received from the vehicle 30 or not. For example, as described above, the vehicle 30 can be configured to light and blink a warning lamp such as a hydraulic warning lamp or an engine warning lamp and transmit a signal indicating occurrence of a problem to the information terminal 10 in a case where the problem has occurred in the hydraulic pressure, engine, or the like. Therefore, in a case where the signal is received, the processing unit 11 (reception unit 11*f*) of the information terminal 10 can determine that a problem has occurred. The processing proceeds to S31 in a case where the signal is received, or S30 is repeatedly performed in a case where no signal has been received.

In S31, the processing unit 11 (detection unit 11*e*) detects agitation of the user at the time of occurrence of a problem. In this step, the processing unit 11 can detect agitation of the user on the basis of a detection result of the biosensor 31 provided in the vehicle 30, since it is assumed that the user may not grip the information terminal 10 at the time of occurrence of a problem. Specifically, the processing unit 11 (second acquisition unit 11*b*) acquires a detection result of the biosensor provided in the vehicle 30 via the network NTW so as to detect (estimate) agitation of the user on the basis of the acquired detection result. Here, in a case where the user grips the information terminal 10 at the time of occurrence of a problem, the processing unit 11 may detect agitation of the user on the basis of a detection result of the posture detection sensor 16 (vibration sensor) or the voice detection sensor 17.

Although the information terminal 10 is configured to detect agitation of the user in the case of the present embodiment, the present invention is not limited thereto, and the server device 20 may be configured to detect agitation of the user. In this case, the server device 20 acquires a detection result of the biosensor 31 provided in the vehicle 30 via the network NTW, and detects agitation of the user on the basis of the acquired detection result. Then, the information terminal 10 (second acquisition unit 11*b*) acquires information indicating the emotion of the user detected by the server device 20 from the server device 20 via the network NTW.

Figure 15:
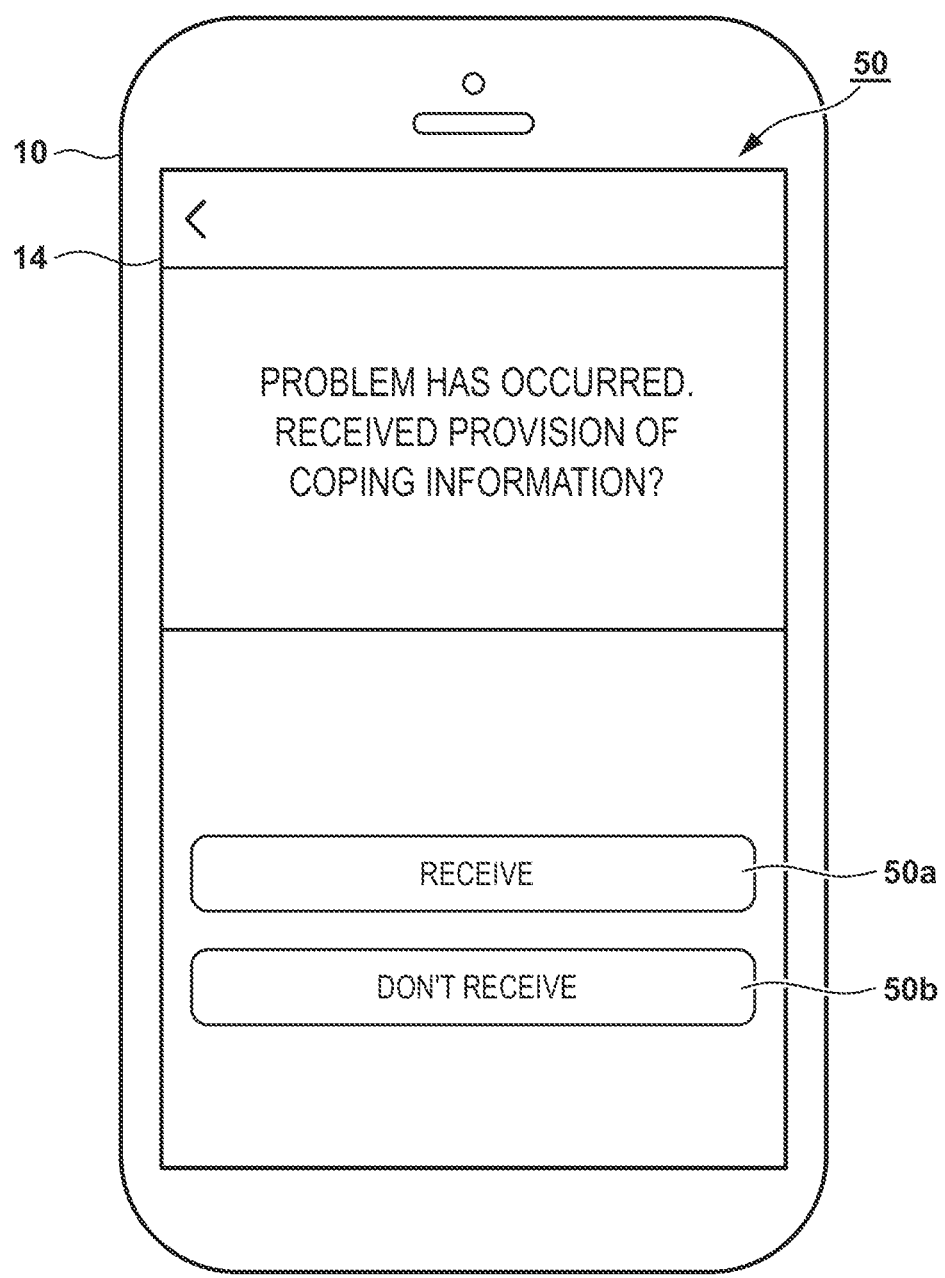
FIG. 15 is a diagram illustrating a confirmation screen for confirming whether to receive provision of coping information or not.

In S32, the processing unit 11 determines whether agitation of the user has been detected or not. In a case where agitation of the user has been detected (i.e., in a case where the user is in an agitated state), the processing proceeds to S33, and a confirmation screen 50 for confirming whether to receive provision of the coping information or not is displayed on the display 14. FIG. 15 is a diagram illustrating the information terminal 10 in a state where the confirmation screen 50 is displayed on the display 14. The confirmation screen 50 displays, for example, a comment of "The problem has occurred. Do you receive provision of coping information?", and the user touches either an answer button 50*a* of "Receive" or an answer button 50*b* of "Don't receive" on the display 14.

On the other hand, in a case where no agitation of the user has been detected in S32, the user is in a normal state, and it is therefore assumed that the user can cope with the problem calmly. Therefore, the processing ends without displaying the confirmation screen 50 on the display 14 so as not to increase botheration or discomfort from displaying the confirmation screen 50. In this case, the processing unit 11 can execute the processing described in the first embodiment (respective steps of the flowchart illustrated in FIG. 2) when an information provision program for providing coping information is separately activated by the user.

In S33, the processing unit 11 determines which of the answer button 50a of "Receive" or the answer button 50b of "Don't receive" has been touched by the user on the confirmation screen 50. In a case where the answer button 50a of "Receive" has been touched, the processing proceeds to S34, and the processing unit 11 can activate an information provision program for providing coping information and execute the processing described in the first embodiment (respective steps of the flowchart illustrated in FIG. 2). On the other hand, in a case where the answer button 50b of "Don't receive" has been touched, the processing ends without activating the information provision program. In this case, the processing unit 11 can execute the processing described in the first embodiment (respective steps of the flowchart illustrated in FIG. 2) when the information provision program is separately activated by the user.

As described above, in the information provision system of the present embodiment, in a case where a problem has occurred, the confirmation screen 50 for confirming whether to receive provision of the coping information or not to the user is displayed on the display 14 in accordance with the detection result of agitation of the user. As a result, even in a case where the user is agitated due to occurrence of a problem, it is possible to guide the user to solve the problem and to solve the problem accurately and early.

SUMMARY OF EMBODIMENTS

1. The information provision system according to the above embodiments is
    an information provision system (e.g., 100) that provides a user with information for coping with a problem by using an information terminal (e.g., 10) having a camera (e.g., 13) and a display (e.g., 14),
    the information provision system being characterized in that
    the information terminal includes:
    identification means (e.g., 11c) that identifies a problem area in a captured image obtained by the camera;
    detection means (e.g., 11e) that detects agitation of the user; and
    display control means (e.g., 11d) that suitably displays a plurality of procedure screens (e.g., 41 to 48) indicating contents of a procedure for coping with the problem area identified by the identification means on the display in accordance with an answer from the user, and
    the display control means changes a procedure screen to be displayed on the display in response to detection of agitation of the user by the detection means.

With this configuration, it is possible to present a procedure content for coping with the problem area in more detail in a case where the user is in an agitated state, while it is possible to reduce botheration that the procedure content is presented in detail in a case where the user is in a normal state. That is, it becomes possible to provide the user with an appropriate procedure content for coping with the problem area in accordance with the state of the user.

2. In the information provision system according to the above embodiments,
    the display control means suitably displays the plurality of procedure screens on the display so as to present, to the user, a more detailed content of the procedure in a case where agitation of the user has been detected by the detection means than in a normal period when no agitation of the user is detected.

With this configuration, it is possible to provide the user with an appropriate procedure content for solving the problem accurately and early even in a case where the user is agitated.

3. In the information provision system according to the above embodiments,
    the display control means sequentially displays the plurality of procedure screens on the display so as to present, to the user, a content of the procedure divided into smaller portions in a case where agitation of the user has been detected by the detection means than in the normal period.

With this configuration, the agitated user can solve the problem accurately and early by referring to the procedure screen displayed on the display.

4. In the information provision system according to the above embodiments,
    the display control means sequentially displays the plurality of procedure screens on the display so as to present a content of the procedure corresponding to the normal period to the user in a case where agitation of the user is no longer detected by the detection means.

With this configuration, it is possible to provide the user with appropriate information so as to reduce botheration, since the user that has calmed down his/her agitation may feel provision of detailed information bothersome.

5. In the information provision system according to the above embodiments,
    the information terminal further includes a vibration sensor (e.g., 16) that detects vibration of the information terminal, and
    the detection means detects agitation of the user on the basis of vibration of the information terminal detected by the vibration sensor.

With this configuration, it is possible to appropriately detect agitation of the user.

6. In the information provision system according to the above embodiments,
    the detection means determines that agitation of the user has been detected in a case where an average value of vibrations of the information terminal detected by the vibration sensor is equal to or larger than a predetermined value.

With this configuration, it is possible to appropriately detect agitation of the user.

7. In the information provision system according to the above embodiments,
    the information terminal further includes a voice detection sensor (e.g., 17) that detects a voice of the user, and
    the detection means detects agitation of the user on the basis of shaking of the voice of the user detected by the voice detection sensor.

With this configuration, it is possible to appropriately detect agitation of the user.

8. In the information provision system according to the above embodiments,
    the display control means determines that agitation of the user has been detected in a case where shaking of the voice of the user detected by the voice detection sensor is equal to or larger than a predetermined value.

With this configuration, it is possible to appropriately detect agitation of the user.

9. In the information provision system according to the above embodiments,
    the information terminal further includes reception means (e.g., 110 that receives a signal indicating occurrence of a problem, and the display control means displays a confirmation screen (e.g., 50) for confirming whether to receive provision of information for coping with the problem or not to the user on the display in a case where the reception means has received the signal.

With this configuration, it is possible to guide the user to solve the problem and to solve the problem accurately and early even in a case where the user is agitated due to the occurrence of the problem.

10. In the information provision system according to the above embodiments, the display control means displays the confirmation screen on the display in a case where the reception means has received the signal and the detection means has detected agitation of the user.

With this configuration, it is possible to display the confirmation screen on the display so as not to increase botheration or discomfort from displaying the confirmation screen for a user in a normal state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information provision system that provides a user with information for coping with a problem by using an information terminal having a camera and a display, wherein
    the information terminal includes at least one processor with a memory comprising instructions, that when executed by the at least one processor, cause the at least one processor to at least:
        identify a problem area in a captured image obtained by the camera;
        detect agitation of the user; and
        suitably display, on the display, a plurality of procedure screens indicating contents of a procedure for coping with the identified problem area, in accordance with an answer from the user, and
    the at least one processor is configured to change a procedure screen to be displayed on the display in response to detection of agitation of the user.

2. The information provision system according to claim 1, wherein at least one processor is configured to suitably display the plurality of procedure screens on the display so as to present, to the user, a more detailed content of the procedure in a case where agitation of the user has been detected than in a case where no agitation of the user has been detected.

3. The information provision system according to claim 2, wherein at least one processor is configured to sequentially display the plurality of procedure screens on the display so as to present, to the user, a content of the procedure divided into smaller portions in a case where agitation of the user has been detected than in a case where no agitation of the user has been detected.

4. The information provision system according to claim 2, wherein in a case where agitation of the user is no longer detected, the at least one processor is configured to sequentially display the plurality of procedure screens on the display so as to present, to the user, a content of the procedure corresponding to a case where no agitation of the user has been detected.

5. The information provision system according to claim 1, wherein
    the information terminal further includes a vibration sensor configured to detect vibration of the information terminal, and
    the at least one processor is configured to detect agitation of the user based on vibration of the information terminal detected by the vibration sensor.

6. The information provision system according to claim 5, wherein the at least one processor is configured to determine that agitation of the user has been detected in a case where an average value of vibrations of the information terminal detected by the vibration sensor is equal to or larger than a predetermined value.

7. The information provision system according to claim 1, wherein
    the information terminal further includes a voice detection sensor configured to detect a voice of the user, and
    the at least one processor is configured to detect agitation of the user based on shaking of the voice of the user detected by the voice detection sensor.

8. The information provision system according to claim 7, wherein the at least one processor is configured to determine that agitation of the user has been detected in a case where shaking of the voice of the user detected by the voice detection sensor is equal to or larger than a predetermined value.

9. The information provision system according to claim 1, wherein
    the information terminal further includes a reception unit configured to receive a signal indicating occurrence of a problem, and
    the at least one processor is configured to display a confirmation screen for confirming whether to receive provision of information for coping with the problem or not to the user on the display in a case where the reception unit has received the signal.

10. The information provision system according to claim 9, wherein the at least one processor is configured to display the confirmation screen on the display in a case where the signal has received by the reception unit and agitation of the user has detected.

11. An information terminal that has a camera and a display and provides a user with information for coping with a problem,
    the information terminal comprising at least one processor with a memory comprising instructions, that when executed by the at least one processor, cause the at least one processor to at least:
        identify a problem area in a captured image obtained by the camera;
        detect agitation of the user; and
        suitably display, on the display, a plurality of procedure screens indicating contents of a procedure for coping with the identified problem area, in accordance with an answer from the user,
    wherein the at least one processor is configured to change a procedure screen to be displayed on the display in response to detection of an agitated state of the user.

12. An information provision method of providing a user with information for coping with a problem by using an information terminal having a camera and a display, the information provision method comprising:
    identifying a problem area in a captured image obtained by the camera;
    detecting agitation of the user; and
    suitably displaying, on the display, a plurality of procedure screens indicating contents of a procedure for coping with the identified problem area, in accordance with an answer from the user,
wherein a procedure screen to be displayed on the display is changed in response to detection of an agitated state of the user.

* * * * *